(12) United States Patent
Weber (10) Patent No.: US 7,661,646 B2
(45) Date of Patent: Feb. 16, 2010

(54) LOCKING MECHANISM FOR SEAT TRACK ASSEMBLY

(75) Inventor: James L. Weber, West Bloomfield, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 505 days.

(21) Appl. No.: 10/568,308

(22) PCT Filed: Aug. 27, 2004

(86) PCT No.: PCT/US2004/027894

§ 371 (c)(1),
(2), (4) Date: Feb. 15, 2006

(87) PCT Pub. No.: WO2005/021319

PCT Pub. Date: Mar. 10, 2005

(65) Prior Publication Data
US 2008/0163717 A1 Jul. 10, 2008

(51) Int. Cl.
*F16M 13/00* (2006.01)

(52) U.S. Cl. ................................................. 248/429

(58) Field of Classification Search ............. 248/423, 248/424, 429, 430, 548; 297/216.17, 216.18, 297/216.19; 74/527, 538
See application file for complete search history.

(56) References Cited

U.S. PATENT DOCUMENTS

| 4,189,957 | A | * | 2/1980 | Gedig et al. | 74/535 |
| 4,712,759 | A | * | 12/1987 | Sugama et al. | 248/429 |
| 5,234,189 | A | * | 8/1993 | Myers | 248/429 |
| 5,564,315 | A | | 10/1996 | Schuler et al. | |
| 5,596,910 | A | | 1/1997 | Bauer et al. | |
| 5,772,173 | A | * | 6/1998 | Couasnon | 248/430 |
| 5,806,825 | A | * | 9/1998 | Couasnon | 248/429 |
| 5,931,436 | A | * | 8/1999 | Rohee | 248/430 |
| 6,113,051 | A | * | 9/2000 | Moradell et al. | 248/430 |
| 6,764,054 | B2 | * | 7/2004 | Becker et al. | 248/429 |
| 7,207,541 | B2 | * | 4/2007 | Frohnhaus et al. | 248/429 |

FOREIGN PATENT DOCUMENTS

| DE | 42 42 895 C1 | 11/1993 |
| DE | 43 37 293 C1 | 12/1994 |
| DE | 297 00 866 U1 | 4/1997 |
| DE | 197 35 030 A1 | 2/1999 |
| GB | 2 372 203 A | 8/2002 |

* cited by examiner

*Primary Examiner*—Korie Chan
(74) *Attorney, Agent, or Firm*—Clark Hill PLC

(57) ABSTRACT

A seat track assembly is provided for adjusting a seat assembly of an automotive vehicle having a lower track (12) having a plurality of locking windows (74), an upper track (14) slidably mounted to the lower track and having a plurality of first (70) and second (72) support apertures. A locking mechanism (80) is operatively coupled between the lower and upper tracks. The locking mechanism includes a plurality of pins (88) movable in and out of a locked position, wherein the pins project through the locking windows and are supported by the first and second support aperture in a double shearing condition to prevent sliding adjustment of the upper track relative in the lower track.

12 Claims, 8 Drawing Sheets

LOCKING MECHANISM FOR SEAT TRACK ASSEMBLY

BACKGROUND OF THE INVENTION

1. Field of the Invention

The present invention relates to a track assembly for a seat assembly of an automotive vehicle. More particularly, the present invention relates to a seat track assembly having a locking mechanism with a plurality of locking fingers movable between a locked position for interlocking upper and lower tracks of the seat track assembly and an unlocked position disengaged from the tracks to allow sliding movement therebetween.

2. Description of the Related Art

Automotive vehicles include seat assemblies for supporting occupants above a floor in the vehicle. Typically, a seat assembly includes a track assembly that is operatively coupled between the seat assembly and the floor of the vehicle and allows selective forward and rearward movement of the seat assembly relative to the floor. The track assembly typically includes a lower track and an upper track slidably engaged therewith, which allows the sliding movement of the seat assembly relative to the floor. Latch or locking mechanisms are commonly known in the art for interlocking the upper and lower tracks to prevent the forward and rearward movement of the seat assembly relative to the floor.

One type of locking mechanism known in the art utilizes a plurality of locking pawls or pins that engage one or more slots or apertures on the lower track to interlock the upper and lower tracks. Examples of these types of locking mechanisms are disclosed in German patents DE 19735030A1, DE 29700866U1 and in U.S. Pat. Nos. 5,596,910 and 5,564,315.

These type of locking mechanisms do not allow "infinite" or "positive" engagement between the upper and lower tracks. That is, the upper track is not lockable relative to the lower track in any position. Rather, the upper track is adjustable relative to the lower tracks in predetermined increments of adjustment, as the occupant of the seat assembly must properly position the upper track along the lower track until at least one of the pins is aligned with the aperture to engage therewith and interlock the upper and lower tracks. Further, such locking mechanisms typically allow a predetermined amount of play or chuck between the upper and lower tracks.

It remains desirable to provide a seat track assembly having a locking mechanism that provides a minimal increment of adjustment and at the same time minimizes chuck between the upper and lower tracks.

SUMMARY OF THE INVENTION

According to one aspect of the invention, a locking mechanism is provided for selectively interlocking upper and lower tracks of a seat track assembly. The locking mechanism includes a pin carrier having a body and at least one arm having an intermediate portion extending between a proximal end fixedly secured to the body and a distal end. The distal end of the arm has a wider profile than the intermediate portion to define a stop edge. The distal end has a bore formed therein. A mounting plate is adapted to be fixedly secured to the upper track. The mounting plate has at least one slot having adjacent narrow and wide portions defining a stop surface due to the difference in size between the narrow and wide portions. The wide portion is adapted to receive the distal end of the arm therethrough during assembly of the pin carrier and the mounting plate. The narrow portion is adapted to slidably receive the intermediate portion of the arm therethrough for selective sliding movement of the pin carrier relative to the mounting plate. The stop surface is engagable with the stop edge of the pin carrier to prevent removal of the arm from the slot. A plurality of pins are slidably coupled to both the pin carrier and the mounting plate for movement in and out of locking engagement with the upper and lower tracks during corresponding movement of the pin carrier relative to the mounting plate. Each of the pins includes a raised step defining opposite first and second abutment surfaces. The first abutment surface is engagable with the body of the pin carrier such that the plurality of pins moves with the pin carrier relative to the mounting plate.

The locking mechanism also includes a plurality of coil springs each energized between the second abutment surface of at least one of the plurality of pins and the mounting plate for continuously biasing apart the pin carrier and the mounting plate.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Referring to FIGS. 1 through 7, a track assembly for a seat assembly (not shown) of an automotive vehicle is generally indicated at 10. The track assembly 10 includes a lower track 12 and an upper track 14. The lower track 12 is adapted to be fixedly secured to a floor in the vehicle. The upper track 14 is adapted to be fixedly secured to a bottom of a seat cushion (not shown) of the seat assembly. The upper track 14 is slidably coupled to the lower track 12 to allow selective forward and rearward movement of the seat cushion among a plurality of seating positions relative to the floor. Described in greater detail below, the track assembly 10 includes a latch or locking mechanism 80 for selectively interlocking the lower 12 and upper 14 tracks to releasably lock the seat cushion in any one of the plurality of seating positions.

Figure 1:
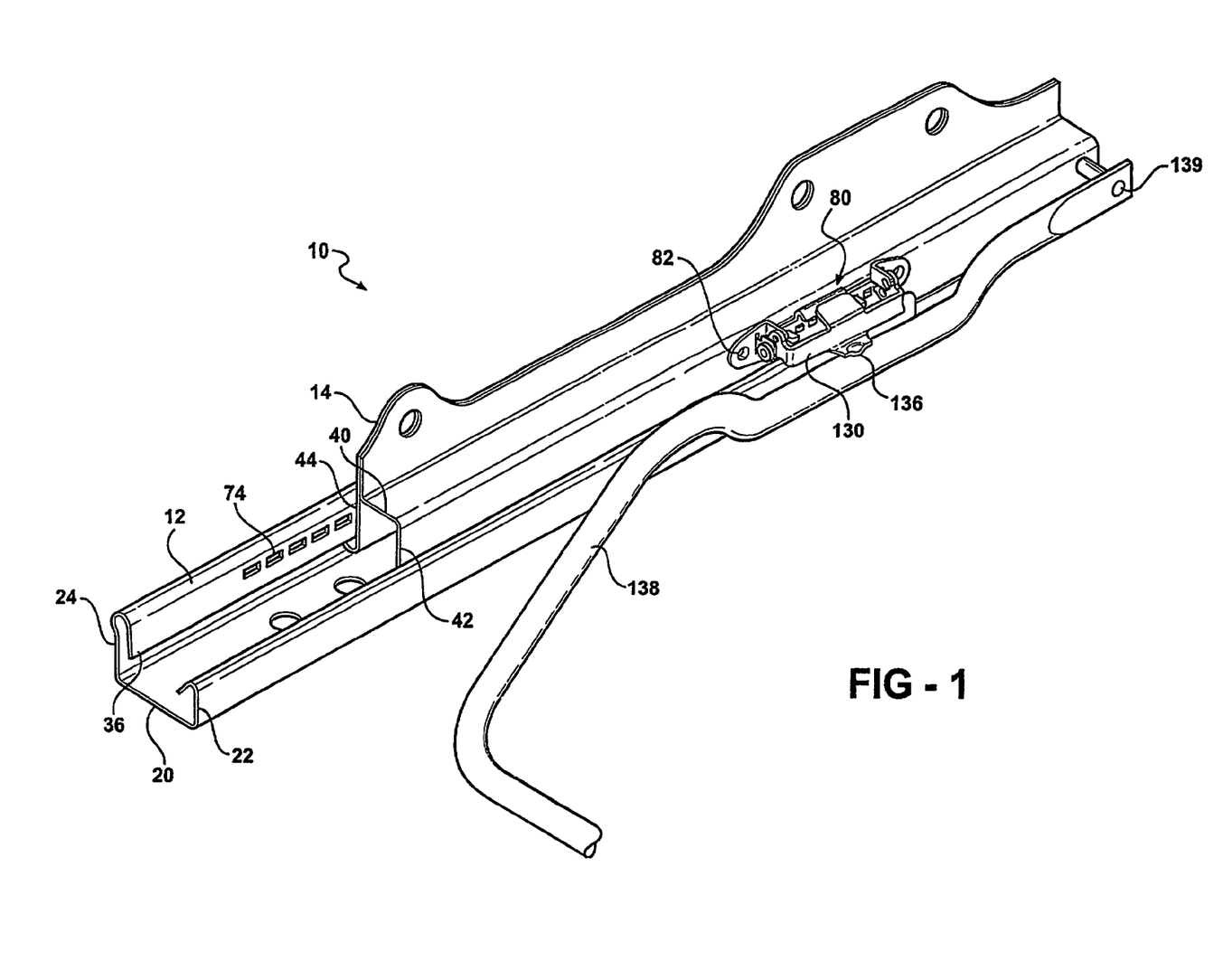
FIG. 1 is a perspective view of a seat track assembly according to one embodiment of the invention.
Figure 2:
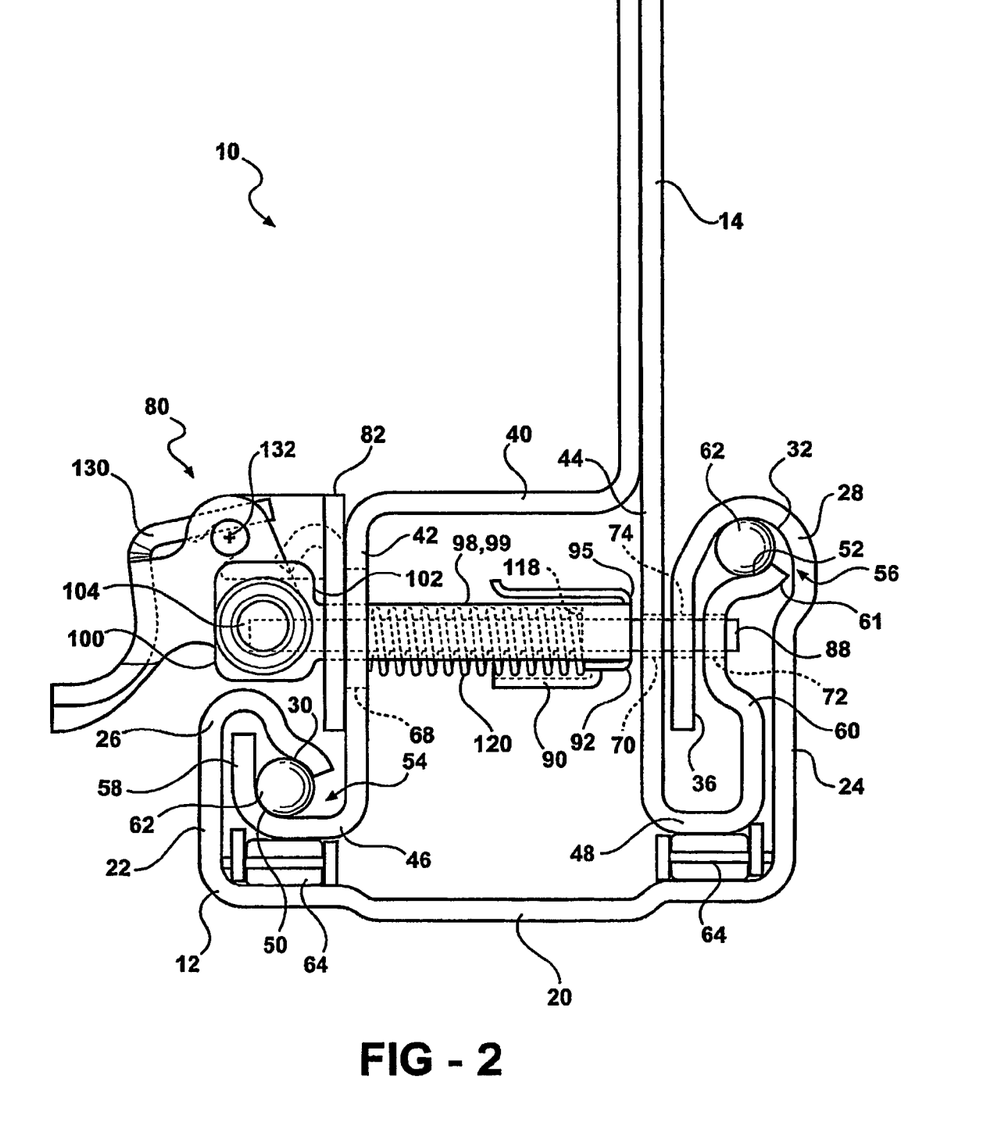
FIG. 2 is a cross sectional view of the seat track assembly and a locking mechanism in the seat track assembly according to one embodiment of the invention.

Referring specifically to FIGS. 1 and 2, the lower track 12 has a generally U-shaped cross section defined by a lower web 20 extending laterally between generally upright inner 22 and outer 24 walls. Each of the inner 22 and outer 24 walls includes hooked portions 26, 28, respectively, that are turned laterally inwardly. Each of the hooked portions 26, 28 defines an upper bearing surface 30, 32. An outer flange 36 protrudes downwardly from the hooked portion 28 of the outer wall 24 toward the lower web 20. The outer flange 36 is generally parallel to and spaced apart from the outer wall 24.

The upper track 14 has a generally U-shaped cross section defined by an upper web 40 that extends laterally between generally upright first 42 and second 44 walls. Each of the first 42 and second 44 walls includes hooked ends 46, 48 that are turned laterally outwardly. The hooked end 46 of the first wall 42 includes a first distal wall 58 that extends upwardly toward the hooked portion 26 of the inner wall 22 of the lower track 12. A second distal wall 60 extends upwardly from the hooked end 48 of the second wall 44 toward the hooked portion 28 of the outer wall 24, such that the outer flange 36 is disposed between the second wall 44 and the second distal wall 60. The second distal wall 60 includes an outwardly flared or bent end 61. Arcuate lower bearing surfaces 50, 52 are defined by the hooked end 46 of the first wall 42 and by the bent end 61 of the second distal wall 60, respectively. Each of the lower bearing surfaces 50, 52 opposes the respective upper bearing surfaces 30, 32 to define generally cylindrical bearing spaces 54, 56 therebetween. Preferably, the lower bearing surfaces 50, 52 are angled inwardly to promote centering of the upper track 14 relative to the lower track 12.

A plurality of ball bearings 62 is disposed in the bearing spaces 54, 56. A plurality of roller bearings 64 is supported between the hooked ends 46, 48 of the upper track 14 and the lower web 20 of the lower track 12. The ball bearings 62 and roller bearings 64 reduce friction during sliding adjustment of the upper track 14 relative to the lower track 12. Preferably, the ball bearings 62 and roller bearings 64 are offset longitudinally to allow elastic deflection between and prevent binding of the lower 12 and upper 14 tracks under heavy loads.

Figure 3:
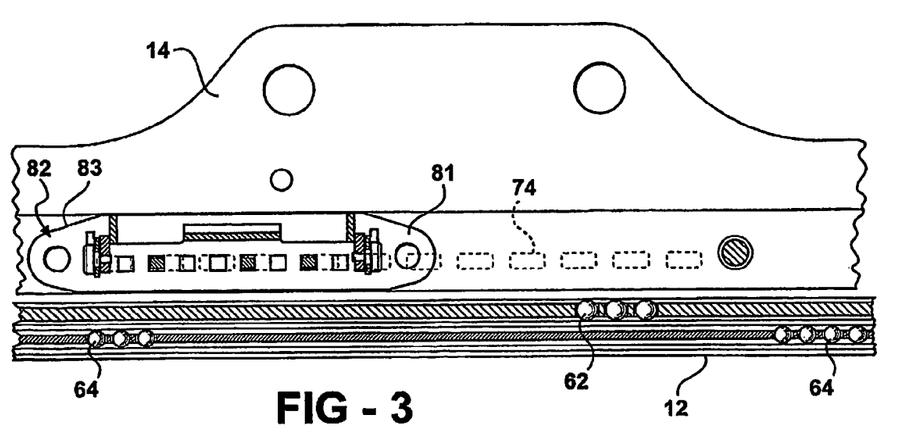
FIG. 3 is an enlarged side view of the seat track assembly.
Figure 4:
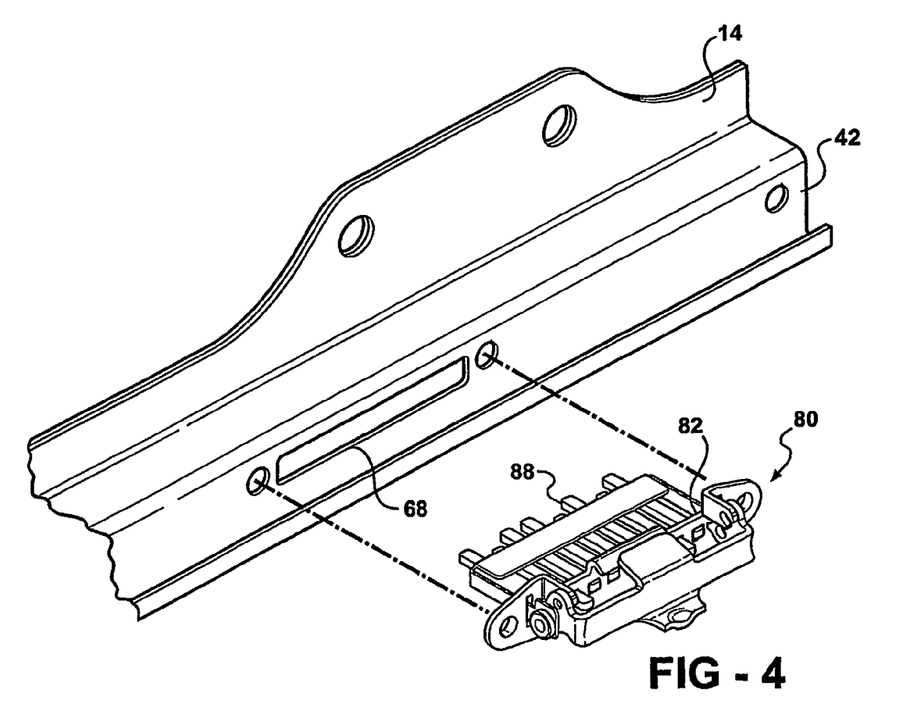
FIG. 4 is an exploded perspective view of the seat track assembly and the locking mechanism.
Figure 5:
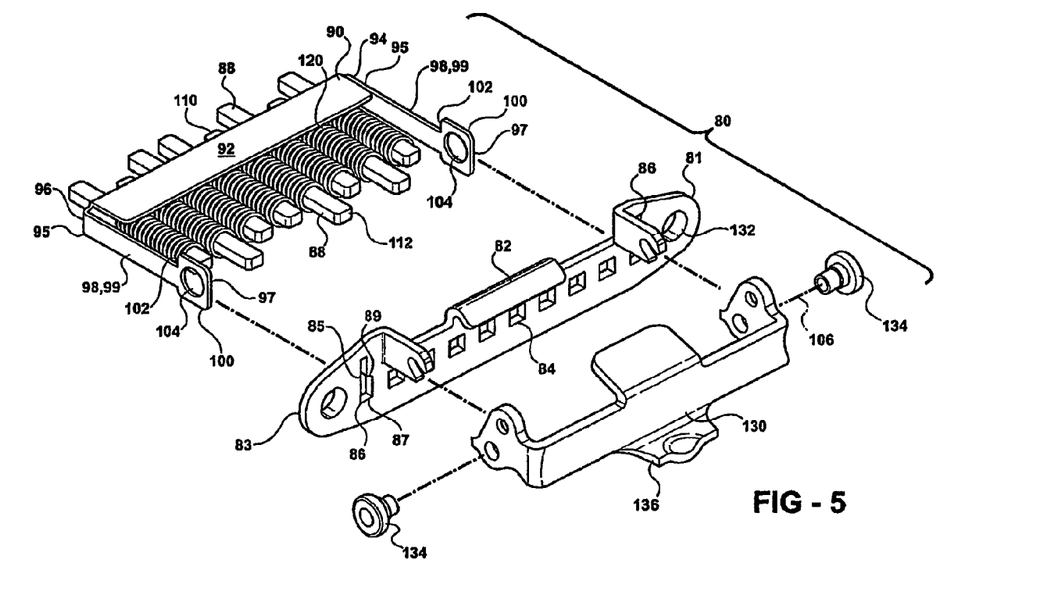
FIG. 5 is an exploded perspective view of the locking mechanism.

Referring to FIGS. 2-4, a generally rectangular cutout 68 is formed in and extends longitudinally along the first wall 42 of the upper track 14. A plurality of first apertures 70 is formed in and disposed longitudinally along the second wall 44 of the upper track 14. The first apertures 70 are evenly spaced apart and aligned opposite with the cutout 68. A plurality of second apertures 72 is formed in and disposed longitudinally along the second distal wall 60 of the upper track 14. The first 70 and second 72 apertures are generally aligned. A plurality of locking windows 74 is formed in and disposed longitudinally along the outer flange 36 of the lower track 12.

Referring to FIGS. 1-5, the locking mechanism 80 is operatively coupled between the lower 12 and upper 14 tracks for releasably interlocking the lower 12 and upper 14 tracks. More specifically, the locking mechanism 80 includes a mounting plate 82 adapted to be fixedly secured to the first wall 42 of the upper track 14. The mounting plate 82 extends between first 81 and second 83 ends. A pair of slots 86 are formed in the mounting plate 82, each disposed on one of the first 81 and second 83 ends of the mounting plate 82. Each slot 86 includes adjacent wide 85 and narrow 87 portions. The narrow portion 87 of the slot 86 defines a stop surface 89. A plurality of third apertures 84 is formed between the slots 86 in the mounting plate 82. The third apertures 84 are generally aligned with the first 70 and second 72 apertures when the mounting plate 82 is fixedly secured to the upper track 14.

Figure 6:
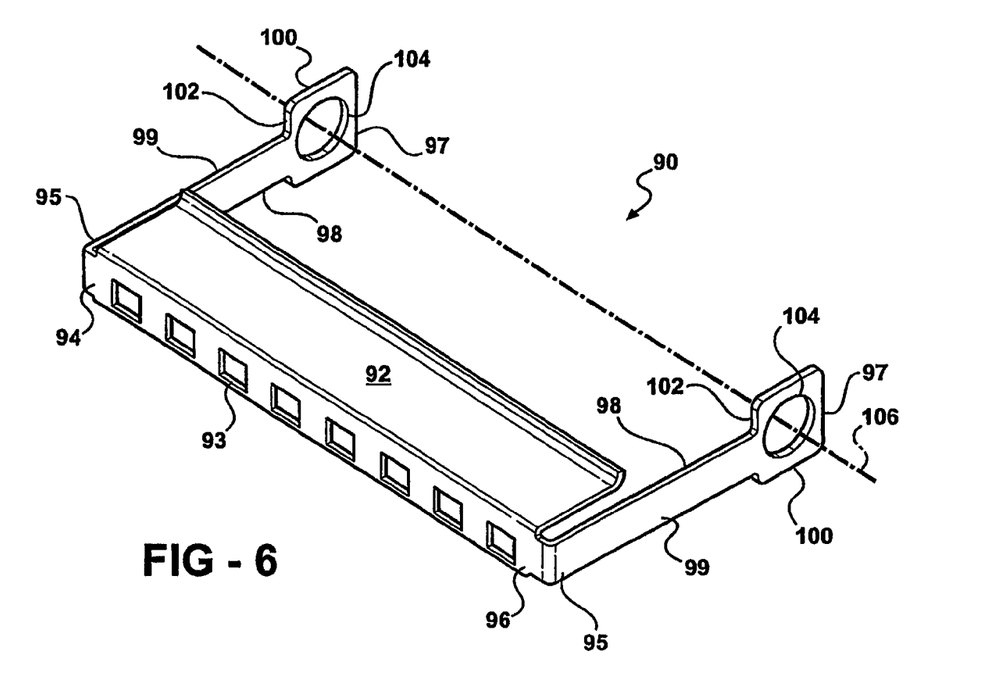
FIG. 6 is a perspective view of a pin carrier in the locking mechanism according to one embodiment of the invention.

The locking mechanism 80 further includes a plurality of pins 88 and a pin carrier 90. The pin carrier 90 includes a body 92 extending between first 94 and second 96 ends. As shown in FIG. 6, a plurality of fourth apertures 93 are formed between the first 94 and second 96 ends of the body 92. The fourth apertures 93 are generally aligned with first 70, second 72 and third 84 apertures for slidably supporting each of the plurality of pins 88 therein.

An arm 98 extends outwardly from each of the first 94 and second 96 ends of the body 92. Each arm 98 includes a proximal end 95 fixedly secured to one of the first 94 and second 96 ends of the body 92, a distal end 97, and an intermediate section 99 extending therebetween. Each arm 98 includes a wide section 100 defined at each distal end 97 thereof. The wide section 100 has a wider profile than the intermediate portion 99. The wide section 100 of the arm 98 is sized to pass through the wide portion 85 of the slot 86 to allow assembly of the pin carrier 90 and the mounting plate 82. The intermediate section 99 of the arm 98 is sized to slidably engage the narrow portion 87 of the slot 86 after assembly of the pin carrier 90 and the mounting plate 82. A stop edge 102 is defined in the arm 98 due to the difference in width between the wide 100 and intermediate 99 sections. The stop edge 102 engages the stop surface 89 of the mounting plate 82 to prevent removal of the arms 98 from the slots 86. A bore 104 is formed in each wide section 100. The bores 104 are coaxial and define a pivot axis 106. In assembly, the arms 98 are slidably engaged within the narrow portions 87 of the slots 86 for lateral displacement of the pin carrier 90 between the first 42 and second 44 walls of the upper track 14.

Figure 7:
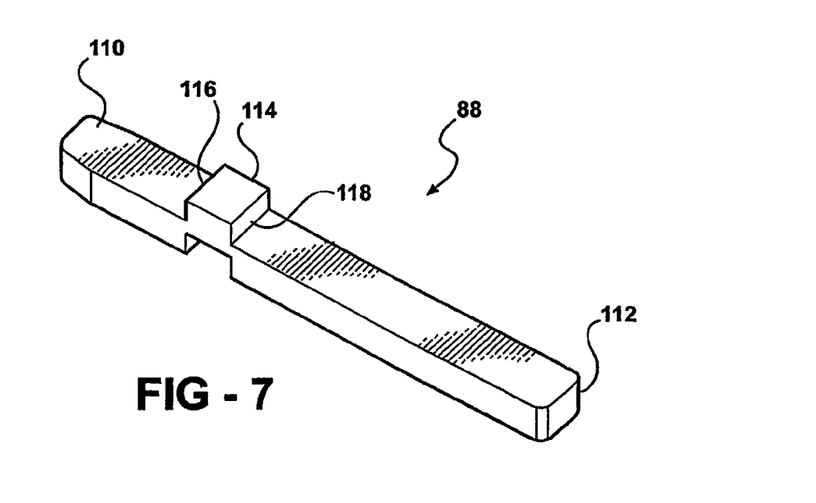
FIG. 7 is a perspective view of a pin in the locking mechanism according to one embodiment of the invention.

As best shown in FIG. 7, each of the pins 88 extends longitudinally between opposite first 110 and second 112 ends. Preferably, the first end 110 of each pin 88 is tapered to facilitate movement of each pin 88 in and out of engagement with the second aperture 72. Each of the pins 88 includes a raised step 114 disposed between the first 110 and second 112 ends. Each raised step 114 defines first 116 and second 118 abutment edges. The first 116 and second 118 abutment edges face the first 110 and second 112 ends, respectively. Each first end 110 of each of the pins 88 is slidably supported in one of the fourth apertures 93 of the pin carrier 90. The first abutment edges 116 are engagable with the body 92 of the pin carrier 90 to prevent the pins 88 from sliding completely through the fourth apertures 93. Similarly, each second end 112 of each of the pins 88 is slidably engaged to one of the third apertures 84 of the mounting plate 82.

The locking mechanism 80 also includes a plurality of coil springs 120. Each of the coil springs 120 is coaxially supported on one of the pins 88 and compressed between the second abutment edge 118 and the mounting plate 82. While the first abutment edges 116 of the pins 88 are engaged with the body 92 of the pin carrier 90, the coil springs 120 bias the pin carrier 90 apart from the mounting plate 82. Engagement between the stop edges 102 and the stop surfaces 89 prevents the arms 98 from exiting the slots 86 due to the force applied by the coil springs 120. Thus, the coil springs 120 are continuously compressed between the mounting plate 82 and the body 92 of the pin carrier 90.

Referring back to FIGS. 1 through 5, the locking mechanism 80 also includes a lever actuator 130. The lever actuator 130 is pivotally coupled to the mounting plate 82 for movement about a pivot axis 132 between unlocked and locked positions. Pivot pins 134 extend through the bores 104 of the arms 98 and pivotally interconnect the lever actuator 130 to the mounting plate 82, so that the pin carrier 90 moves laterally between the first 42 and second 44 walls in response to the pivotal movement of the lever actuator 130 between the locked and unlocked positions, respectively. Specifically, in the locked position, the stop edges 102 of the arms 98 are held against the stop edges 89 of the mounting plate 82 by the compression of the coil springs 120. Movement of the lever actuator 130 about the lever pivot axis 132 toward the unlocked position causes the pin carrier 90 to move toward the mounting plate 82. The pins 88 move with the pin carrier 90. The arms 98 slide within the narrow portions 87 of the slots 86 and the second ends 112 of the pins 88 slide within the third apertures 84 to accommodate the movement of the pin carrier 90 relative the mounting plate 82. The pins 88 move toward the mounting plate 82 with the pin carrier 90 as the body 92 of the pin carrier 90 engages the first abutment edges 116 of the pins 88.

As shown in FIG. 1, the lever actuator 130 includes a cam flange 136. A "towel bar" or handle 138 is pivotally coupled to the upper track 14 by pivot pin 139. The handle 138 engages the cam flange 136 during manual actuation of the handle 138 to facilitate movement of the lever actuator 130 between the locked and unlocked positions.

As shown in FIG. 4, the locking mechanism 80 can be pre-assembled prior to installation to the lower 12 and upper 14 tracks. After the locking mechanism 80 has been assembled, the mounting plate 82 is fixedly secured to the upper track 14 so that the pins 88 are aligned with the cutout 68 in the first wall 42. The second ends 112 of the pins 88 can pass through the cutout 68 to accommodate the movement of the pin carrier 90 relative to the mounting plate 82. All of the pins 88 are slidably supported by the first apertures 70 of the upper track 14 as the pins 88 are moved in and out of the locking windows 74 by the pivotal movement of the lever actuator 130 between the locked and unlocked positions, respectively. Preferably, the pins 88 and locking windows 74 are sized and spaced so that, in the locked position, at least three out of five of the pins 88 are forced by the coil springs 120 through three adjacent locking windows 74 to prevent forward and rearward movement of the upper track 14 relative to the lower track 12. Most preferably, the pins 88 in the locked position are received through the locking windows 74 and supported by the first 70 and second 72 apertures, so that the pins 88 are in a double shearing condition under loading of the upper track 14 relative to the lower track 12. More specifically, with the pins 88 extending through the locking windows 74 in the lower track 12 and extending through each of the first 70 and second 72 apertures of the upper track 14, any forces exerted upon the seat assembly and passing through the pins 88 are transferred through and supported by the outer flange 36 of the lower track 12 and both the second wall 44 and second distal wall 60 of the upper track 14 to provide extra load support and secure locking between the lower 12 and upper 14 tracks.

Figure 8A:
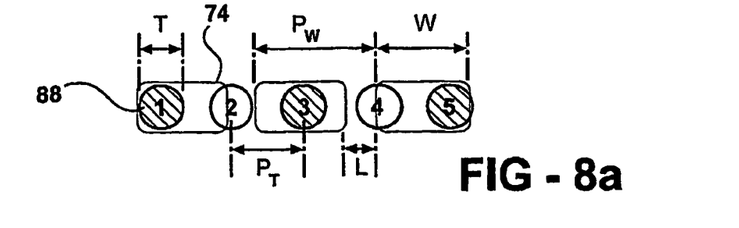
FIGS. 8a-8f are schematic views of the sizing and spacing relationship between the pins and locking windows in the locking mechanism according to one embodiment of the invention.
Figure 8B:
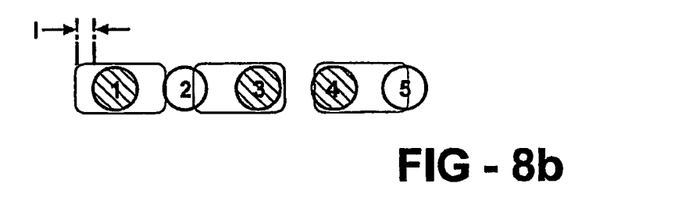
Figure 8C:
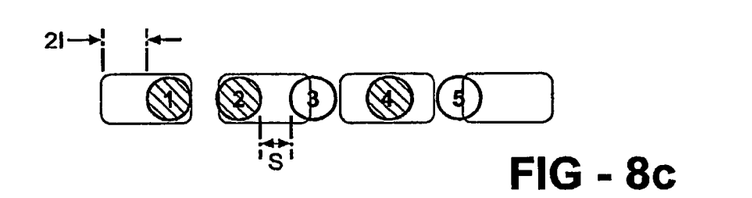
Figure 8D:
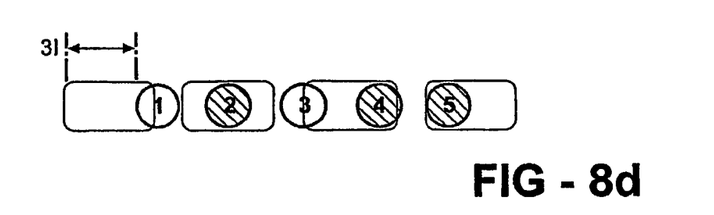
Figure 8E:
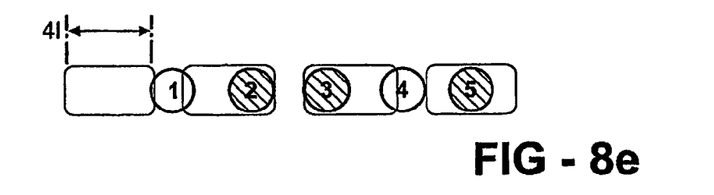
Figure 8F:
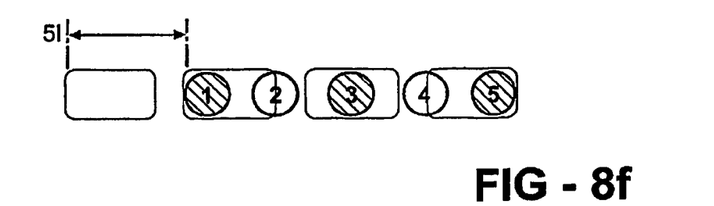

The sizing and spacing of the pins 88 and locking windows 74 is best shown in FIGS. 8a through 8f. Each of the FIGS. 8b through 8f represent successive increments of travel of the upper track 14 relative to the lower track 12, after that which is shown in FIG. 8a. For example, FIG. 8b represents one increment of travel and FIG. 8f represents five increments of travel from that shown in FIG. 8a. The distance of one increment of adjustment is I. The pins 88 are represented by circles labeled 1 through 5. Solid circles indicate pins 88 that are engaged with locking windows 74. Each of the pins 88 has a pin width t. The spacing between adjacent pins 88 is S. The pitch or distance between the centers of adjacent pins 88 is $P_t$. The pitch or distance between leading edges of adjacent locking windows 74 is $P_w$. The width of land or distance between adjacent locking windows 74 is L. Each locking window 74 has a window width W. To ensure that at least three of five pins 88 will engage the locking windows 74, the sizing and spacing of the pins 88 and locking windows 74 is established by the following equations in terms of increment I and pin width t.

$P_t = 3I;$ $P_w = 5I;$ $W = 2I + t;$ $L = 3I - t;$ and $S = P_t - t.$

In the preferred embodiment, the increment of adjustment I is 2.5 mm; the width t of each pin 88 is 3.5 mm; the pitch $P_t$ of the pins 88 is 7.5 mm; the pitch $P_w$ of the locking windows 74 is 12.5 mm; the width of the land L between adjacent locking windows 74 is 4.0 mm; and the width W of each locking window 74 is 8.5 mm.

In operation, the upper track 14 can be adjusted relative to the lower track 12 by unlocking the locking mechanism 80. The lever actuator 130 is rotated about the pivot axis 132 to the unlocked position by manual actuation of the handle 138. The pin carrier 90 is pulled laterally toward the mounting plate 82 against the force of the coil springs 120 as the lever actuator 130 rotates toward the unlocked position. The body 92 of the pin carrier 90 engages the first abutment edges 116 of the pins 88 so that the pins 88 are displaced with the pin carrier 90 toward the mounting plate 82. When the second ends 112 of the pins 88 have exited the locking windows 74, the upper track 14 is forwardly or rearwardly slidable relative to the lower track 12. The lever actuator 130 must be manually maintained in the unlocked position while the upper track 14 is adjusted relative to the lower track 12.

After the upper track 14 has been adjusted to a desired position, the handle 138 is released to allow the lever actuator 130 to return to the locked position. The coil springs 120, compressed between the mounting plate 82 and the second abutment edges 118, force the pins 88 and the pin carrier 90 away from the mounting plate 82. The stop edge 102 of the pin carrier 90 engages the stop surface 89 of the mounting plate 82 to prevent further lateral movement of the pin carrier 90. The pins 88 are continuously forced toward engagement with the locking windows 74 and the second support apertures 72. As described above, at least three pins 88 engage the locking windows 74 and the second support apertures 72 to lock the upper track 14 in the desired position relative to the lower track 12.

Figure 9:
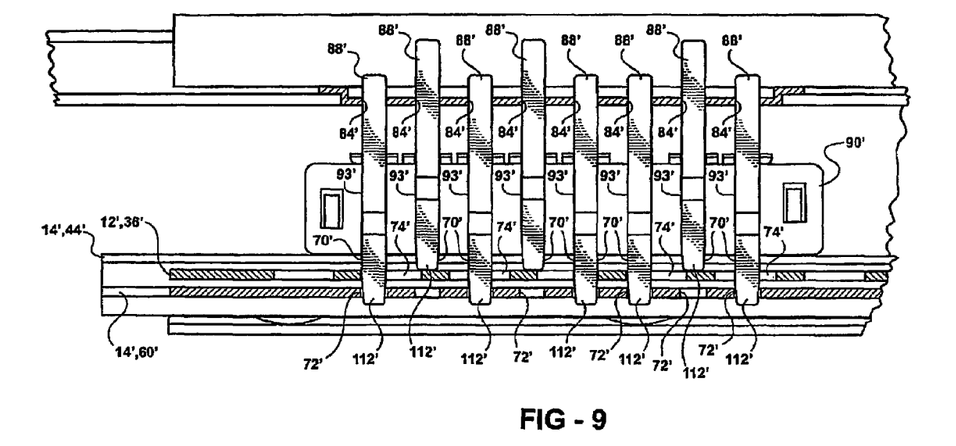
FIG. 9 is a cross sectional view of the seat track assembly and the locking mechanism according to an alternative embodiment of the invention.
Figure 10:
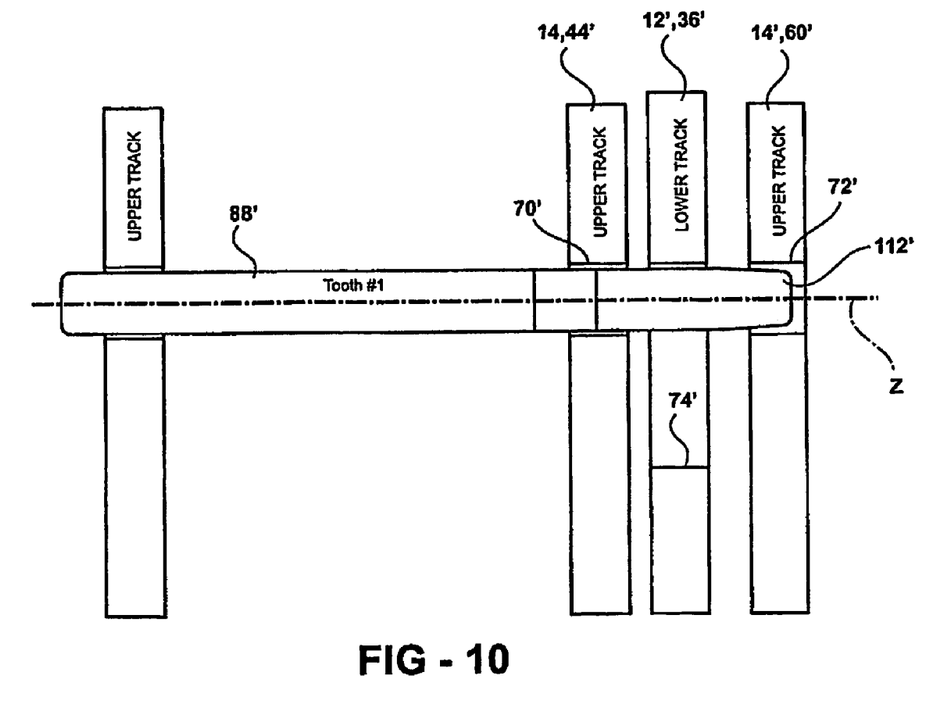
FIG. 10 is a schematic view of the locking mechanism according to the alternative embodiment of FIG. 9.

Referring to FIGS. 9 and 10, an alternative embodiment of the invention is shown, wherein elements of the alternative embodiment similar to those in the first embodiment are indicated by primed reference characters. The pins 88' are slidably supported in the first 70', second 72', third 84' and fourth 93' support apertures for movement in and out of locking engagement with the locking windows 74'. The first ends 112' of the pins 88' are tapered to facilitate movement of the pins 88 in and out of the locking windows 74' and the second apertures 72'. The second apertures 72' are offset in a longitudinal sense relative to the first apertures 70'. The offset of the second apertures 72' relative to the first apertures 70' causes the pins 88 in the locked position to rotate and interfere or jam against the outer flange 36 of the lower track 12. Further, second apertures 72' on opposite sides of a reference plane Z, indicated by a dashed line, are offset in opposite directions with respect to the reference plane Z. As a result, at least two pins 88 in the locked position are rotated in opposite directions to minimize chuck or play of the upper track 14 relative to the lower track 12. For example, pin numbers 1 and 5 are rotated in opposite directions against the outer flange 36 at opposite ends of the respective second apertures 72' to minimize play between the lower 12 and upper 14 tracks.

It should be appreciated by those skilled in the art that while eight pins engaging five locking windows are shown in FIGS. 3, 5, 6 and 9, the invention requires only at least five pins for engaging three locking window. Additional pins and locking windows are utilized to enhance the strength and anti-chuck characteristics of the locking mechanism.

The invention has been described in an illustrative manner, and it is to be understood that the terminology, which has been used, is intended to be in the nature of words of description rather than of limitation. Many modification and variations of the present invention are possible in light of the above teachings. It is, therefore, to be understood that within the scope of the appended claims, the invention may be practiced other than as specifically described.

What is claimed is:

1. A locking mechanism for selectively interlocking upper and lower tracks of a seat track assembly, said locking mechanism comprising:
    a pin carrier having a body and at least one arm having an intermediate portion extending between a proximal end fixedly secured to said body and a distal end, said distal end of said arm having a wider profile than said intermediate portion to define a stop edge;
    a mounting plate adapted to be fixedly secured to the upper track, said mounting plate having at least one slot having adjacent narrow and wide portions defining a stop surface due to the difference in size between said narrow and wide portions, said wide portion adapted to receive said distal end of said arm therethrough during assembly of said pin carrier and said mounting plate, said narrow portion adapted to slidably receive said intermediate portion arm therethrough for selective sliding movement of said pin carrier relative to said mounting plate, said stop surface engagable with said stop edge of said pin carrier to prevent removal of said arm from said slot; and
    a plurality of pins slidably coupled to both said pin carrier and said mounting plate for movement in and out of locking engagement with the upper and lower tracks during corresponding movement of said pin carrier relative to said mounting plate.

2. A locking mechanism as set forth in claim 1, wherein each of said plurality of pins extend between opposing first and second end and include a raised step defining opposite first and second abutment surfaces, said first abutment surface engagable with said body of said pin carrier such that said plurality of pins move with said pin carrier relative to said mounting plate.

3. A locking mechanism as set forth in claim 2 including a plurality of coil springs each energized between said second abutment surface of at least one of said plurality of pins and said mounting plate for continuously biasing apart said pin carrier and said mounting plate and for continuously biasing said plurality of pins toward said locking engagement with the upper and lower tracks.

4. A locking mechanism as set forth in claim 3 wherein said body of said pin carrier extends between first and second ends and includes a plurality of spaced apart support apertures formed in said body between said first and second ends for slidably supporting said respective plurality of pins.

5. A locking mechanism as set forth in claim 4 wherein said mounting plate extends between first and second ends and includes a plurality of spaced apart support apertures formed between said first and second ends axially aligned with said respective plurality of support apertures in said pin carrier for slidably supporting said respective plurality of pins.

6. A locking mechanism as set forth in claim 5 further including a lever actuator pivotally coupled to said mounting plate for movement about a pivot axis between locked and unlocked positions to accommodate movement of said pin carrier relative to said mounting plate.

7. A locking mechanism as set forth in claim 6 further including pivot pins pivotally interconnecting said lever actuator to each of said arms of said pin carrier and defining a pivot axis therebetween for moving said pins and pin carrier relative to said mounting plate in response to pivotal movement of said lever actuator between said locked and unlocked positions.

8. A seat track assembly comprising:
    a lower track having an outer distal wall, said outer distal wall having a plurality of locking windows formed therein;
    an upper track slidably coupled to said lower track for movement among a plurality of seating positions relative to said lower track, said upper track including a wall and a distal wall spaced apart from said wall for receiving said outer distal wall of said lower track therebetween during movement of said upper track relative to said lower track, said wall and said distal wall each having corresponding pluralities of first and second support apertures; and
    a locking mechanism for selectively interlocking said upper and lower tracks, said locking mechanism having a plurality of pins selectively movable in and out of a locked position, wherein said plurality of pins extends through said locking window of said lower track and is supported by said first and second support apertures of said upper track in a double shearing condition to prevent sliding adjustment of said upper track relative to said lower track, and wherein each of said plurality of pins has a predetermined pin width and each of said plurality of locking windows has a predetermined window width that is at least the sum of said predetermined pin width plus twice said predetermined adjustment increment.

9. A seat track assembly as set forth in claim 8 wherein said locking mechanism allows incremental adjustment of said upper track relative to said lower track among said plurality of seating positions, wherein said plurality of seating positions are equally spaced by a predetermined adjustment increment.

10. A seat track assembly as set forth in claim 9 wherein each of said plurality of locking windows are spaced apart by a predetermined distance defining a land that is no greater than three times said predetermined adjustment increment less said predetermined pin width.

11. A seat track assembly as set forth in claim 10 wherein said plurality of pins has a predetermined pin pitch defined by the distance between the centers of adjacent pins, said predetermined pin pitch no greater than three times said predetermined adjustment increment.

12. A seat track assembly as set forth in claim 11 wherein said second apertures are offset longitudinally relative to said first apertures to cause said plurality of pins to rotate into interference with said outer distal wall flange to minimize chuck between said upper and lower tracks.

* * * * *